T. DOUGLAS.
REGULATING DEVICE.
APPLICATION FILED JUNE 17, 1916.

1,238,113.

Patented Aug. 28, 1917.
2 SHEETS—SHEET 2.

Inventor
THEODORE DOUGLAS.
Attorney
Wm. F. Nickel.

UNITED STATES PATENT OFFICE.

THEODORE DOUGLAS, OF SCARBORO, NEW YORK.

REGULATING DEVICE.

1,238,113.  Specification of Letters Patent.  Patented Aug. 28, 1917.

Application filed June 17, 1916. Serial No. 104,257.

*To all whom it may concern:*

Be it known that I, THEODORE DOUGLAS, a citizen of the United States, residing at Scarboro, in the county of Westchester and State of New York, have invented certain new and useful Improvements in Regulating Devices, of which the following is a specification.

My invention pertains to improvements in the regulation of internal combustion engines; particularly internal combustion engines for motor boats, vehicles, and other conveyances; and it has for its object to provide a construction including controlling means, such as a throttle valve, for the supply of power fluid; and a regulator, such as governor, for the valve; which are capable of being easily and quickly adjusted with respect to each other for the purpose of meeting variations in the conditions under which the engine is running; and changes in the desired speed of the engine, corresponding to each set or adjustment of the regulator; whereby a uniform speed of the engine can be maintained and its proper mode of operation assured.

It is well known that ordinary governors for internal combustion engines are designed to act at a fixed maximum speed of the engine to throttle the gaseous fuel; and that they leave much to be desired in practice because the maximum engine speed for most efficient operation under one load is not the same as for efficient operation under other working conditions. My invention disclosed herein aims to overcome this drawback by a combination of parts which enables the governor to be connected to the engine and be driven therefrom by a single shaft or the like; and at the same time be provided with means that are always ready at hand and permanently in accessible position to be manipulated; so that the attendant can at any moment change the relation of the governor to the throttle, and thus alter the speed at which the governor will actuate the throttle to reduce the fuel supply. The governor can thus be set to respond to different speeds, according to the load carried by the engine; or the speed requirements of the vehicle; or the special conditions encountered from time to time by the conveyance in its travel.

The purpose of my invention may be best understood by considering the conditions under which an engine operates in a motor boat. At whatever speed the boat may be propelled in rough water, the propeller will alternately be so lifted and depressed by the action of the waves as to cause the load upon the engine to vary constantly; and at times the load upon the engine will fluctuate between great extremes, as when the propeller is deeply submerged and then completely lifted out of the water. A considerable variation in speed results; and this is detrimental to the engine and the boat and extremely unpleasant to the passengers. Under the above described conditions, the manual operation of the throttle is not sufficient to meet these rapid and extensive changes in the resistance of the propeller.

The purpose of my invention is to take care of these conditions by providing a valve and a regulator or controller therefor of such design as to be immediately responsive to alterations in the resistance to the revolution of the propeller, by terminating or continuing the flow of power fluid; and which valve and regulator will be effective and equally responsive in providing an automatic control at whatever engine speed, and hence for whatever boat speed, the controller may be set to permit. My invention may therefor be designated as a throttle provided with a coacting controller, so designed as to prevent the engine from exceeding a predetermined maximum speed for every throttle position.

On the drawings, which illustrate one or more embodiments of my invention:

Fig. 3 is a perspective view of a detail;

Fig. 4 is a longitudinal section on the line 4—4 of Fig. 5, of a device that may be used in connection with the arrangement shown in Fig. 1; and Fig. 5 is a section taken on the line 5—5 of Fig. 4.

The same numerals are used to identify the same parts throughout.

Figure 1:
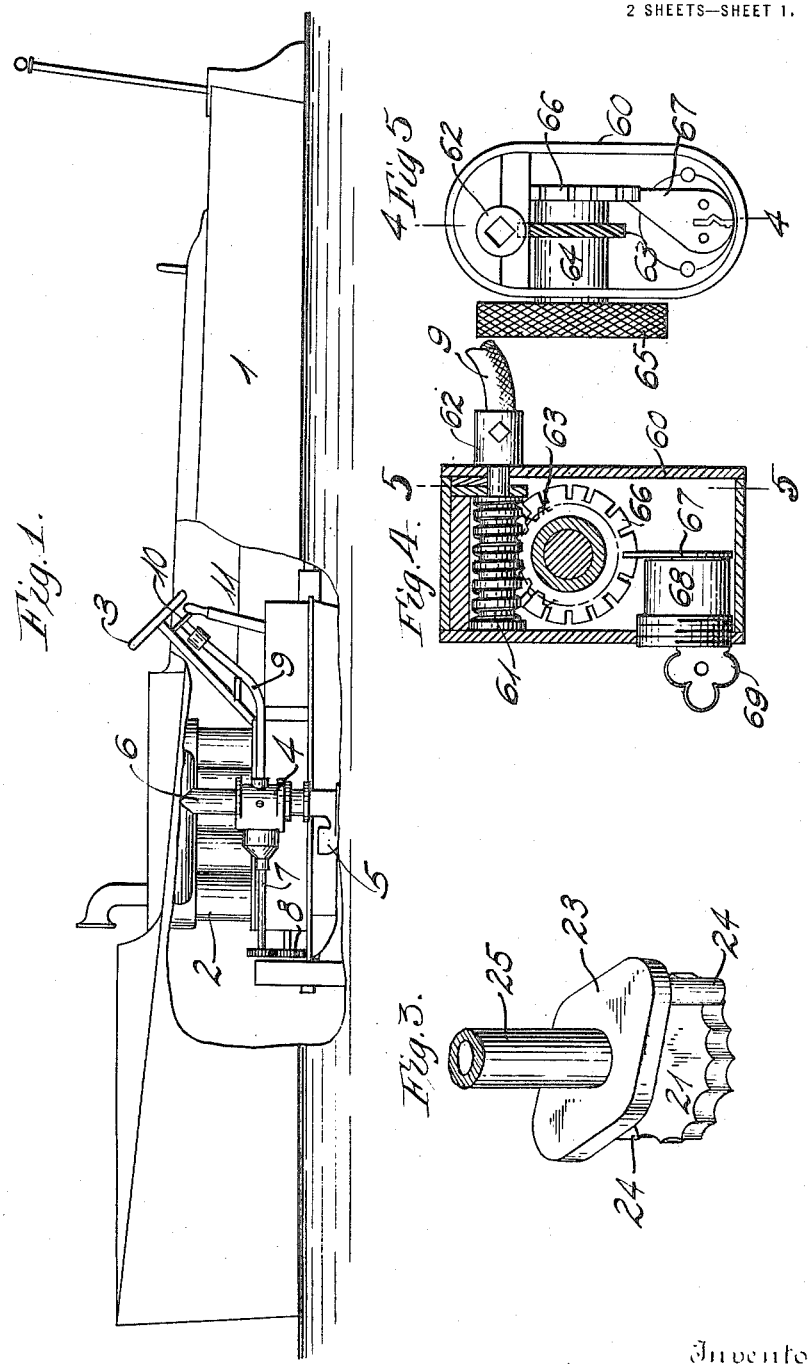
Figure 1 is a side view showing an arrangement embodying the features of my invention, mounted upon a power boat.

In the particular description of the drawings, the numeral 1 indicates a boat propelled by an engine 2, and steered by a wheel 3. In proximity to the engine is a casing 4 that incloses in one end means, such as a throttle valve, for controlling the supply of power fluid to the explosion chambers; and at its other end is a regulator, such as governor, to actuate the valve. This valve and governor are shown in detail on Fig. 2, and will be more fully described hereinafter. That portion of the casing 4 which contains the throttle is connected at one end to the carbureter 5, and the other to the intake manifold 6; while the portion which houses the governor admits a shaft 7 which carries a gear to mesh with a toothed wheel 8; driven by the valve-cam shaft, for example, of the engine 2. The governor and the throttle of course have a connection between them; and I provide for adjusting the connection in question so as to be able to set the governor for the speeds desired by a flexible shaft or cable 9, that communicates with the inside of the casing 4 and extends therefrom to a point beside the wheel 3, some distance removed. It bears an operating member, such as a wheel 10, which can be manipulated by the attendant in the cockpit 11.

By means of this arrangement, as will be made clear in the following parts of this specification, the regulator is always in condition to be adjusted; and the speed of the engine at which the throttle will act can be changed at any time with readiness and ease to suit the conditions under which the boat is to be run.

Figure 2:
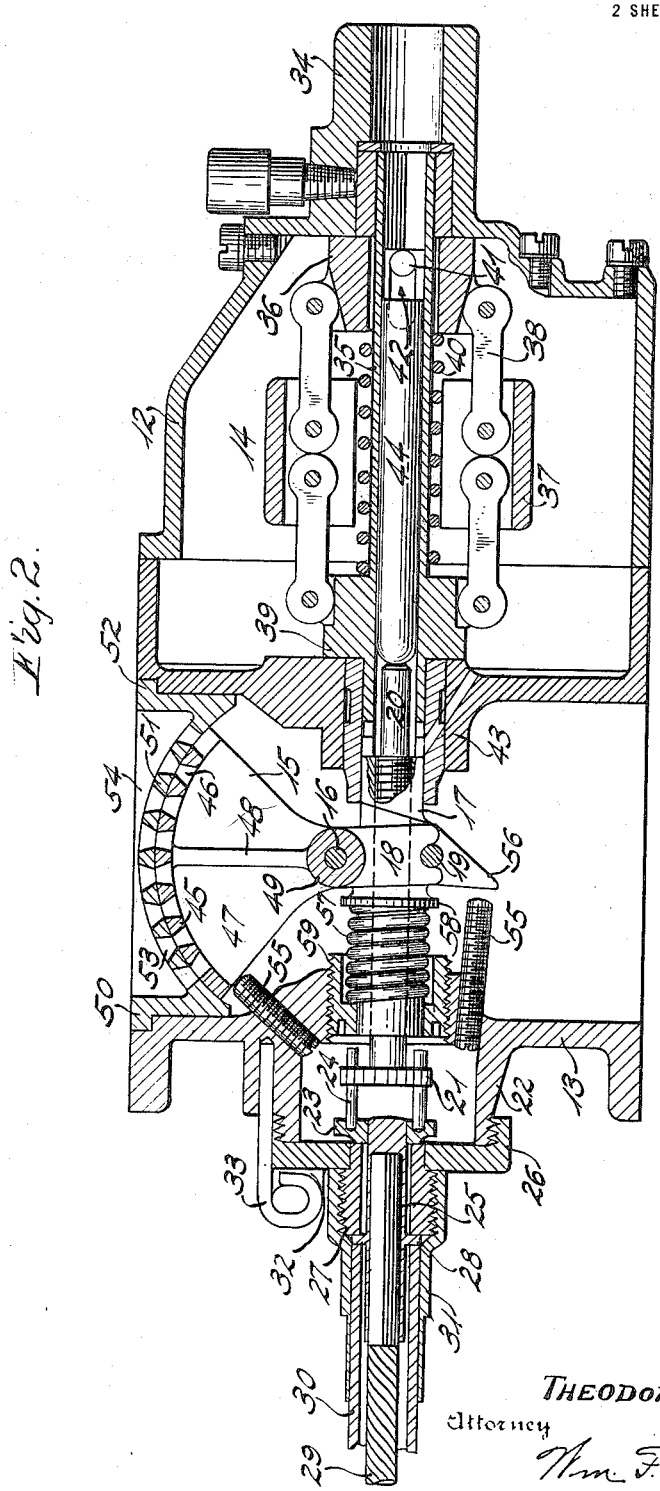
Fig. 2 is a longitudinal section taken through a governor and valve employed in the practice of my invention.

By referring to Fig. 2, the casing 4 will be seen to comprise two sections 12 and 13; the former containing the regulator 14, and the latter the throttle valve 15. These two sections are joined together in any suitable way. When united they will make a closed chamber for the governor; while the section 13 will be open at the top and bottom; being provided in effect with a vertical passage through it which corresponds in cross-section to the interior of the fuel supply conduit; and with flanges at its top and bottom to enable the section 13 to be inserted into the conduit and be secured by bolts. The valve 15 is a pivoted grid valve, mounted to oscillate on a pin 16, and actuated by a reciprocable shaft 17. This shaft is flanked by a pair of arms 18 projecting from the valve 15, and having recessed outer ends to receive a transverse pin 19 fixed to the shaft 17. The shaft 17 also has a longitudinal threaded bore to admit a threaded element 20, which is directly actuated by the governor when the fuel supply is to be reduced, or, if need be, entirely cut off. The element 20 can be longitudinally adjusted by rotating it in the shaft 17; and through this element the governor can be caused to act at different speeds. Therefore the shaft 17 and the element 20 constitute a transmission device by which the governor can move the valve 15 when required.

The element 20 extends through to the outside of the casing 4; and bears on its outer extremity a wheel or disk 21. This disk is encircled by a boss 22 on the exterior of the casing 4; and has peripheral notches that enable it to be slidingly engaged by an actuating member in the form of a yoke consisting of a head or plate 23, and pins or arms 24. These arms fit opposite notches in the wheel 21; but obviously if the disk were larger, a pair of holes receiving the arms 24 would answer the same purpose. To the plate 23 is rigidly secured a spindle 25, extending in a direction opposite to that of the pins 24; and this spindle projects through a cap 26 which screws on and off the boss 22. The cap has a central opening through which the spindle passes, and the opening receives in tight-fitting engagement an external bearing 27 for the spindle. The spindle has an exterior collar 28, and the bearing 27 will be between the collar and the transverse plate 23; hence axial motion of the spindle will be prevented.

The outer end of the spindle 25 will have a polygonal bore to engage the end of a flexible shaft or cable 29, having a cover or sheath 30. This cable and its sheath are indicated collectively by the numeral 9 in Fig. 1. On its exterior, the bearing 27 will be threaded to receive a sleeve 31 that projects out beyond the end of the spindle 25, and protects the joint between the spindle and the shaft 29; and this sleeve will receive the end of the cover or sheath 30. I may also provide for locking the cap 26 on the boss 22 by furnishing it with perforated lugs 32, two in number arranged side by side, though one only is shown; and using a locking pin 33. There will be a recess in the boss 22, which will be a continuation of a groove in the edge of the cap; and when the pin 33 is put into this groove and recess, with its eyeleted outer end between the lugs 32, a padlock can be passed through the lugs to prevent withdrawal of the pin and removal of the cap.

Hence by turning the wheel 10, the element 20 can be manipulated. The cable 9 can extend to any part of the boat or vessel 1; from the engine room to the pilot house, for instance; and it may have several wheels like the wheel 10 placed at convenient points along its length, if desired.

I shall now proceed to describe the elements which constitute the governor for actuating the throttle valve. This governor is of special design and has its peculiar mode of operation. It connects with the shaft 7 through a hollow boss 34 at the end of the casing 4 remote from the section 13; and comprises a hollow shaft 35 having a bearing in the boss 34, and carrying adjacent thereto a collar 36. This collar must rotate with the shaft 35, but can move along the same to a certain extent; and it is united to a set of centrifugal weights 37 by links 38. Near the section 13, the shaft 35 has a fixed collar 39, that is joined to the weights by similar links. A spring 40 encircles the shaft 35 between the collars 36 and 39, and normally keeps the weights 37 close to the shaft 35. The collar 36 has a transverse pin or bolt 41 which extends through the shaft 35; the latter having slots 42 to receive it; and at its opposite end the governor shaft is supported in a bearing 43, in the side of the section 13. On its interior the shaft 35 has a floating actuating member 44 in contact at one end with the element 20; and when the weights move the pin 42 against the other end of the member 44, the member pushes the element 20 to the left. This member is of sufficient mass to have considerable inertia, and it likewise has frictional engagement with the inside of the shaft 35. Any fluctuations in the action of the governor due to vibrations, shocks, etc., are suppressed by this member; and the governor freed from the influence of anything but speed factors in its operation.

The throttle valve is both removably and adjustably mounted in the section 13, and plays an important part in the successful operation of my invention. It includes a curved plate 45, having transverse slots constituting parallel ports 46; and the plate is integral with a web 47 having stiffening ribs 48. The web is sector-shaped, and at its center or corner it has a hub or bearing 49, which receives the pin 16. The seat for this valve comprises an annular element 50, encircling a curved web 51, and having a peripheral flange 52 to rest upon a shoulder in the upper end of the bore through the section 13 and enable the member to be removably secured in place. The web has slots 53 corresponding to the slots 46; and may have a transversely reinforcing rib 54. The slots of the valve and the slots of the seat contract toward each other, and give a Venturi-tube effect that produces a uniform mixture of the air and hydrocarbon, such as gasolene. Adjustable bolts 55, one engaging the web 47, when the valve is open; and the other engaging a projection 56 from the bottom of the shaft 17, between the arms 18, when the valve is shut, limit the range of movement of the valve. These bolts have kerfs in their outer ends, to be turned by a tool; and are accessible within the boss 22, when the cap 26 is off. The governor moves the valve shut; and it is held open by a spring 57, abutting a collar 58 on the shaft 17. This shaft has one end in the bearing 43, and its other end in a threaded nut 59, screwed in an opening in the side of the section 13 at the center of the boss 22. The nut has recesses to be engaged by a tool in its outer face, and on its inner face it has an annular shoulder to seat the spring 59.

The utility of my invention will now be apparent. When the boat is moving ahead, the governor is set to actuate the valve at the required speed of the engine; and this speed can be varied as desired. If the boat pitches or rolls, lifting the propeller out of the water, or otherwise exposing it, the engine is prevented from racing by the governor immediately closing the valve; and as soon as the propeller is again submerged, the governor opens the valve sufficiently to take care of the load on the engine. The governor is thus always in readiness to respond to the power requirements of the engine, and to meet such requirements.

This construction can also be employed on motor cars and trucks as well as boats; and the engine speed changed in the same way. For low gear service, the governor or regulator can be set to act upon the valve 15 at a relatively high engine speed; while for high gear service, the governor can be set by the element 20 to act at a relatively low engine speed. Thus the maximum engine speed can be suited and chosen to the load and road conditions, and varied whenever variations in the operating conditions arise to necessitate a readjustment.

Instead of the wheel 10, the device illustrated in Figs. 4 and 5 may be connected to the outer end of the cable 9. This device includes a casing 60 in which is journaled a worm gear 61. One end of this worm gear projects to the outside of the casing, and carries a coupling 62, having a polygonal bore to receive an end of the cable 9. A screw may be employed to secure the cable and the coupling together. The casing 60 also contains a worm wheel 63 on an arbor 64; and the arbor extends through to the outside of the casing 60 and bears an operating member or hand wheel 65. On the same arbor, within the casing 60, is a disk 66 having recesses to be engaged by a latch 67, operated by a cylinder or tumbler lock construction 68. When a key is inserted into this lock, the latch can be moved to engage or release the disk 66. When the disk is released, one turn of the wheel 65 will produce several turns of the worm 61. The casing 60 may have perforated lugs, not shown, to enable it to be screwed to the side of the cockpit 11, or be provided with a clamp, not shown, so that it can be fastened to a pipe or rail. It may be employed on either a boat or a car, and the lock is useful, to prevent tampering with the governor, when the owner is absent, or to hold the shaft 9 and the element 20 in adjusted position.

I of course do not wish to be limited to the exact details of my invention herein disclosed; but reserve the right to change the shape, size and arrangement of the structural features shown, to the full extent of the general meanings of the terms in which the claims are expressed.

Having described my invention, what I claim as new and desire to secure and protect by Letters Patent of the United States is:—

1. The combination of an engine, means for controlling the supply of power fluid thereto, a regulator for the controlling means located at one side thereof, a flexible shaft on the opposite side of said means, an operating member on the shaft, means for adjusting the regulator with respect to the controlling means, said adjusting means being connected to the shaft, and means adjacent said member for locking said shaft.

2. The combination of an engine, means for controlling the supply of motive agent thereto, a regulator adjacent said means, a transmission device including an adjustable element between the regulator and the controlling means, a shaft carrying said element coaxially and connected to the controlling means, and a flexible shaft slidably connected to said element, and having one or more operating members thereon for actuating said element.

3. The combination of means for controlling the supply of power fluid to an engine, a regulator for said means, a transmission device between the regulator and the controlling means, said device including a movable element having a disk thereon, a yoke slidingly engaging said disk, a flexible shaft, and means for connecting the shaft to the yoke, whereby the regulator may be adjusted through the device, by said shaft.

4. The combination of means for controlling the supply of power fluid to an engine, a regulator for the said means, a transmission device between the regulator and the controlling means, said means including a rotatable and longitudinally movable element, a flexible shaft, a spindle joined to the shaft, a yoke on the end of the spindle, a wheel on the element having notches slidingly receiving said yoke, and means for inclosing said wheel and yoke, providing a bearing for the spindle.

5. The combination of means for controlling the supply of power fluid to an engine, a regulator for the controlling means, a transmission device between the controlling means and the regulator, a casing for the controlling means, the regulator, and the transmission device, said device comprising a rotatable, longitudinally movable element extending through the casing to the outside thereof, an actuating member having sliding engagement with said element, but rotatable therewith, a spindle having a collar rigid with said member, a bearing for the spindle, between the collar and said member, a flexible shaft connected to the spindle, a sleeve secured to the bearing, and a cover for the shaft having its end received in said sleeve.

6. The combination of means for controlling the supply of power fluid to an engine, a regulator for the controlling means, a transmission device between the controlling means and the regulator, a casing for the controlling means, the regulator and the transmission device, said device comprising an adjustable element extending through the casing to the outside thereof, a flexible shaft connected to the element to actuate the same and adjust the regulator with respect to the controlling means, a worm connected to the shaft, a worm wheel meshing with the worm, a hand wheel for the worm wheel, and a lock comprising a recessed element rigid with the worm wheel, and a latch to engage said recessed element to secure the worm wheel against rotation.

7. The combination of an engine, means for controlling the supply of motive agent thereto, a regulator adjacent said means, a transmission device including an adjustable element between the regulator and the controlling means, and a shaft carrying said element, said shaft and said element being coaxial and connected to the controlling means, and a flexible shaft slidably connected to said element, and having one or more operating members thereon for actuating said element, whereby the regulator may be manipulated by the flexible shaft through the transmission device.

8. The combination of means for controlling the supply of power fluid to an engine, a regulator for the said means, a transmission device between the regulator and the controlling means, said device including a rotatable and longitudinally movable element, a flexible shaft, a spindle joined to the shaft, a yoke on the end of the spindle, a wheel on the element having notches slidingly receiving the yoke, and means for inclosing the wheel and yoke, providing a bearing for the spindle, whereby the regulator may be manipulated by the spindle through said transmission device.

9. The combination of an engine, means for controlling the supply of power fluid thereto, a regulator for the controlling means located at one side thereof, a transmission device comprising an adjustable element between the regulator and the controlling means, said element extending beyond said controlling means to the opposite side thereof, and means comprising a shaft on the opposite side of the controlling means connected to said element to operate same.

10. The combination of an engine, means for controlling the supply of motive agent thereto, a regulator for the controlling means located at one side of the same, a transmission device between the regulator and the controlling means, said device including an adjustable element extending beyond the controlling means to the opposite side thereof, and means comprising a shaft on the opposite side of the controlling means to operate said element, said means being connected to said element so as to be movable relative thereto.

11. The combination of an engine, means for controlling the supply of motive agent thereto, a regulator for the controlling means, a transmission device between the regulator and the controlling means, said device including an adjustable element, a casing for the regulator, the controlling means and said transmission device, said element projecting to the outside of said casing; means on the outside of said casing to engage said element and operate the same, and a bearing for said means carried on the outside of said casing.

12. The combination of an engine, means for controlling the supply of motive agent thereto, a regulator for the controlling means, a transmission device between the regulator and the controlling means, said device including an adjustable element, a casing for the regulator, the controlling means and said transmission device, said element projecting to the outside of said casing; means on the outside of said casing to engage said element and operate the same, and a bearing for said means carried on the outside of said casing, said means being connected to said element so as to be movable relative thereto.

In testimony whereof, I have signed my name to this specification this 14th day of June, 1916.

THEODORE DOUGLAS.

Witnesses:
OSCAR MAUTNER,
WALTER WEISS.